US011461189B1

(12) United States Patent
Yadav et al.

(10) Patent No.: US 11,461,189 B1
(45) Date of Patent: Oct. 4, 2022

(54) METHOD AND SYSTEM FOR ARCHIVING USER DATA DURING BACKUP GENERATION

(71) Applicant: EMC IP Holding Company LLC, Hopkinton, MA (US)

(72) Inventors: Sunil Yadav, Bangalore (IN); Shelesh Chopra, Bangalore (IN); Amarendra Behera, Bangalore (IN); Tushar Dethe, Bangalore (IN); Himanshu Arora, Ghaziabad (IN); Deependra Pratap Singh, Kanpur (IN); Jigar Premjibhai Bhanushali, Valsad (IN); Sapna Chauhan, Bangalore (IN); Anjana Rao, Mangalore (IN); Vipin Kumar Kaushal, Bharthana (IN); Ravi Vijayakumar Chitloor, Bengaluru (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 4 days.

(21) Appl. No.: 17/233,682

(22) Filed: Apr. 19, 2021

(51) Int. Cl.
*G06F 12/00* (2006.01)
*G06F 11/14* (2006.01)
*G06F 3/06* (2006.01)
*G06F 16/11* (2019.01)

(52) U.S. Cl.
CPC .......... *G06F 11/1464* (2013.01); *G06F 3/067* (2013.01); *G06F 3/0619* (2013.01); *G06F 3/0652* (2013.01); *G06F 11/1435* (2013.01); *G06F 11/1461* (2013.01); *G06F 11/1469* (2013.01); *G06F 16/113* (2019.01)

(58) Field of Classification Search
None
See application file for complete search history.

(56) References Cited

U.S. PATENT DOCUMENTS

| 7,395,282 | B1 * | 7/2008 | Crescenti | G06F 3/0683 |
| 9,852,149 | B1 * | 12/2017 | Taylor | G06F 16/1844 |
| 10,496,599 | B1 * | 12/2019 | Haravu | G06F 11/1451 |
| 2016/0216903 | A1 * | 7/2016 | Joshi | G06F 3/067 |

* cited by examiner

Primary Examiner — Daniel D Tsui
(74) Attorney, Agent, or Firm — Chamberlain, Hrdlicka, White, Williams & Aughtry

(57) ABSTRACT

A system for providing data protection services for user data generated by an application includes persistent storage that includes an archive storage and a backup storage. The system also includes a manager. The manager is programmed to generate data chunks using user data, generate backup object metadata associated with the data chunks; obtain previously generated backup object metadata associated with the user data using an archive value, make a first determination that at least one data chunk of the data chunks is to be archived using the backup object metadata and the previously generated backup object metadata, and, in response to the first determination: store the at least one data chunk in the archive storage as a portion of a user data backup, and store remaining data chunks of the data chunks in the backup storage as the remaining portion of the user data backup.

20 Claims, 11 Drawing Sheets

METHOD AND SYSTEM FOR ARCHIVING USER DATA DURING BACKUP GENERATION

BACKGROUND

Computing devices may provide services. To provide the services, the computing devices may include hardware components and software components. Data may be generated by the computing devices during the performance of the services. The data may be important to users. To protect the data, backups of the data may be generated and stored in storage devices.

SUMMARY

In general, in one aspect, the invention relates to a system for providing data protection services for user data by an application includes persistent storage that includes an archive storage and a backup storage. The system also includes a manager. The manager is programmed to generate data chunks using user data; generate backup object metadata associated with the data chunks; obtain previously generated backup object metadata associated with the user data using an archive value; make a first determination that at least one data chunk of the data chunks is to be archived using the backup object metadata and the previously generated backup object metadata; and in response to the first determination: store the at least one data chunk in the archive storage as a portion of a user data backup; and store remaining data chunks of the data chunks in the backup storage as the remaining portion of the user data backup.

In general, in one aspect, the invention relates to a method for providing data protection services for user data generated by an application in accordance with one or more embodiments of the invention. The method includes generating data chunks using user data; generating backup object metadata associated with the data chunks; obtaining previously generated backup object metadata associated with the user data using an archive value; making a first determination that at least one data chunk of the data chunks is to be archived using the backup object metadata and the previously generated backup object metadata; and in response to the first determination: storing the at least one data chunk in the archive storage as a portion of a user data backup; and storing remaining data chunks of the data chunks in the backup storage as the remaining portion of the user data backup.

In general, in one aspect, the invention relates to a non-transitory computer readable medium which includes computer readable program code, which when executed by a computer processor enables the computer processor to performs a method for providing data protection services for user data generated by an application in accordance with one or more embodiments of the invention. The method includes generating data chunks using user data; generating backup object metadata associated with the data chunks; obtaining previously generated backup object metadata associated with the user data using an archive value; making a first determination that at least one data chunk of the data chunks is to be archived using the backup object metadata and the previously generated backup object metadata; and in response to the first determination: storing the at least one data chunk in the archive storage as a portion of a user data backup; and storing remaining data chunks of the data chunks in the backup storage as the remaining portion of the user data backup.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

In general, embodiments of the invention relate to a system and method for archiving user data during backup generations. More specifically, embodiments of the invention relate to performing smart archive backup operations on user data. A manager of a storage may proactively transfer user data backups associated with users that have been removed from a client service provider to archive storage during a smart archive backup operation. Further, the manager of the storage may transfer unchanged data blocks from backup storage to archive storage based on a retention period and an archive value associated with the data chunks by performing smart archive backup operations to optimize the storage of data chunks without going against protection policy requirements.

Figure 1A:
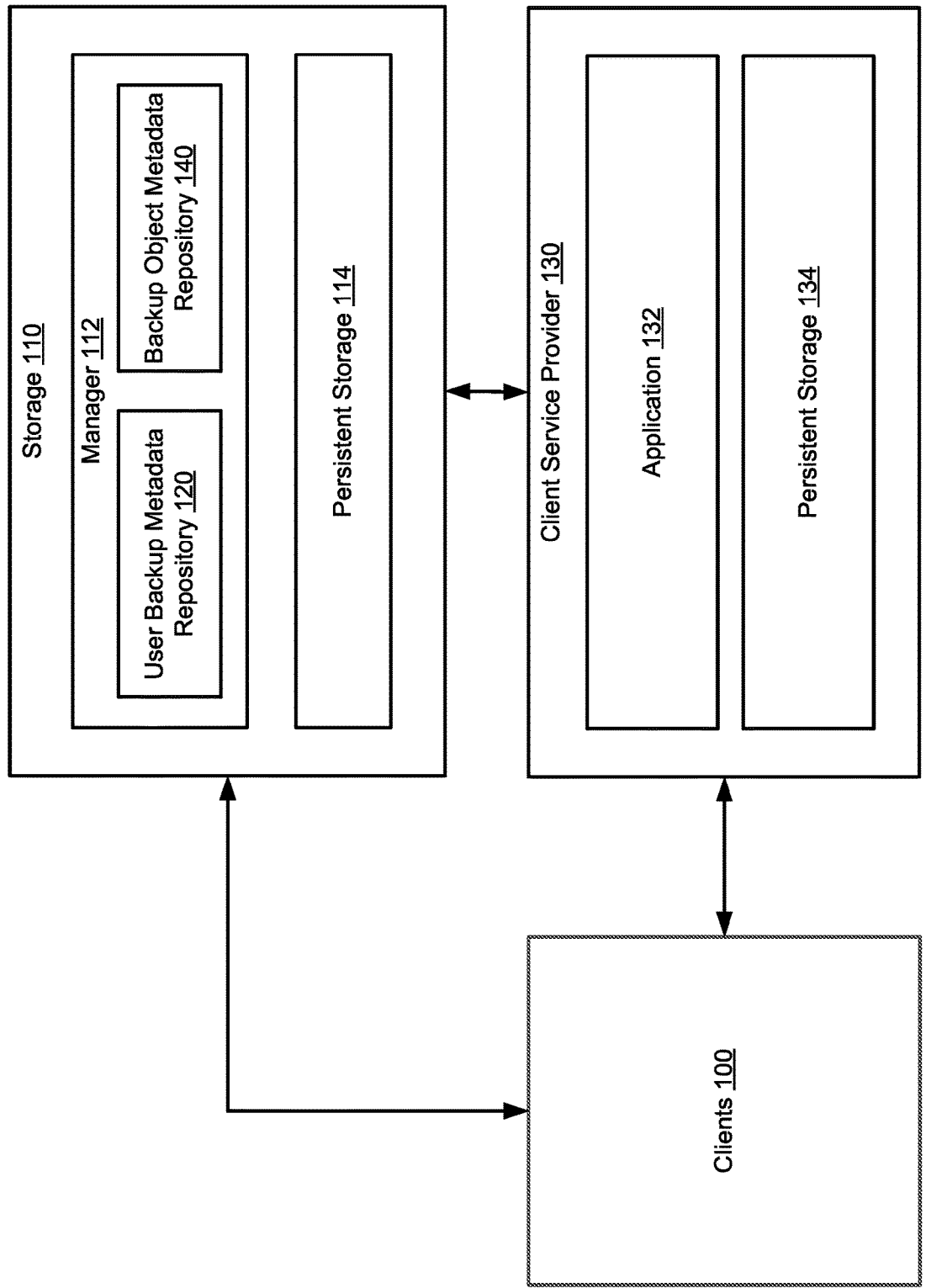
FIG. 1A shows a diagram of a system in accordance with one or more embodiments of the invention.

FIG. 1A shows a diagram of a system in accordance with one or more embodiments of the invention. The system may include any number of clients (100), a storage (110), and a client service provider (130).

The clients (100), operated by users, may utilize services provided by the client service provider (130). For example, the client service provider (130) may provide calendar services. The client service provider (130) may provide other and/or additional services such as data storage services, electronic mail services, instant messaging services, etc. that may be utilized by the clients without departing from the invention. The client service provider (130) may host an application (132) that provides all, or a portion, of the services provided by the client service provider (130).

When the clients (100) utilize the services provided by the client service provider (130), data (e.g., user data) that is relevant to the clients (100) may be stored in persistent storage (134) of the client service provider (130). However, the user data may be lost, become corrupt, inaccessible, or undesirable for other reasons. Therefore, it may be desirable to obtain or store backups of user data. For example, it may be desirable to store such backups in the storage (110) so that if the data stored in the client service provider (130) becomes undesirable, the backups may be used to restore the user data.

However, the application (132) may gate or otherwise restrict access to all, or a portion, of the user data. In other words, additional and/or special methods may be required to obtain the user data to generate user data backups of user data associated with calendar events and/or calendar groups.

To enable the user data of the client service provider (130) to be restored, embodiments of the invention may provide a system that provides backup services and restoration services. By doing so, the user data stored in the client service provider (130) may be restored, or partially restored, to previous forms or desired forms.

The backup services provided by the system of FIG. 1A may include generating user data backups of user data stored on the client service provider (130) that enable granular restorations of user data associated with calendar events and restorations of user data associated with calendar groups. The user data backups may be generated by performing smart archive backup operations. The smart archive backup operations may be manual smart archive backup operations (i.e., use a manual archive value specified in a protection policy) or default smart archive backup operations (i.e., use the default archive value). The backup services may also include storing the user data backups in the storage (110) for future use.

The restoration services may include restoring user data on the client service provider (130) to previous point in time using the user data backups stored in the storage (110).

The system may include additional, fewer, and/or different components without departing from the invention. Each component may be operably connected to any of the other components via any combination of wired and/or wireless connections. Each of the components of the system illustrated in FIG. 1A is discussed below.

The clients (100) may be implemented using computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions described in this application and/or all, or a portion, of the methods illustrated in FIGS. 3A-3B. The clients (100) may be implemented using other types of computing devices without departing from the invention. For additional details regarding computing devices, refer to FIG. 5.

The clients (100) may be implemented using logical devices without departing from the invention. For example, the clients (100) may include virtual machines that utilize computing resources of any number of physical computing devices to provide the functionality of the clients (100). The clients (100) may be implemented using other types of logical devices without departing from the invention.

In one or more embodiments of the invention, the clients (100) obtain computer implemented services from the client service provider (130). A computer implemented service may be, for example, managing a database, serving files, and/or other types of computer implemented services that may be utilized by users of the clients. The computer implemented services may be other types of services without departing from the invention.

When using the computer implemented services provided by the client service provider (130), the clients (100) may generate and/or obtain user data which may be stored in the client service provider (130).

For example, when using data database services, the clients (100) may store information from a user in a database. Users of the clients (100) may desire access to the aforementioned information in the future. Consequently, the future availability of the user data stored in the database may be valuable to the users of the clients (100).

Similarly, other entities may desire access to all, or a portion, of the user data stored in the client service provider (130) at future points in time. For example, other entities may desire to obtain access to information in a database hosted by the client service provider (130).

To improve the likelihood that such user data is available in the future, the clients (100) may utilize backup and/or restoration services provided by the storage (110) and/or client service provider (130). As discussed above, the backup and/or restoration services provided by the storage (110) may include the orchestration of user data backup generation and the storage of user data backups through the performance of smart archive backup operations, and/or using user data backups to restore user data.

When utilizing the backup and/or restoration services provided by the storage (110), the clients (100) may grant permission to the storage (110) to access user data located in the client service provider (130). By doing so, the storage (110) may obtain user data from the client service provider (130) and generate user data backups.

The storage (110) may be implemented using computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions described in this application and/or all, or a portion, of the methods illustrated in FIGS. 3A-3B. The storage (110) may be implemented using other types of computing devices without departing from the invention. For additional details regarding computing devices, refer to FIG. 5.

The storage (110) may be implemented using logical devices without departing from the invention. For example, the storage (110) may include virtual machines that utilize computing resources of any number of physical computing devices to provide the functionality of the storage (110). The storage (110) may be implemented using other types of logical devices without departing from the invention.

In one or more embodiments of the invention, the storage (110) provides backup services and/or restoration services to the clients (100). The backup and/or restoration may include (i) performing smart archive backup operations to move user data associated with user that were deleted from backup storage to archive storage, (ii) and generating user data backups of user data by storing portions of user data in archive storage that have not changed throughout a period specified by an archive value and a retention period (discussed below), and (iii) restoring user data using user data backups. The storage (110) may provide other and/or additional services without departing from the invention.

To provide the above noted services of the storage (110), the storage (110) may include a manager (112) and persistent storage (114).

Figure 3A:
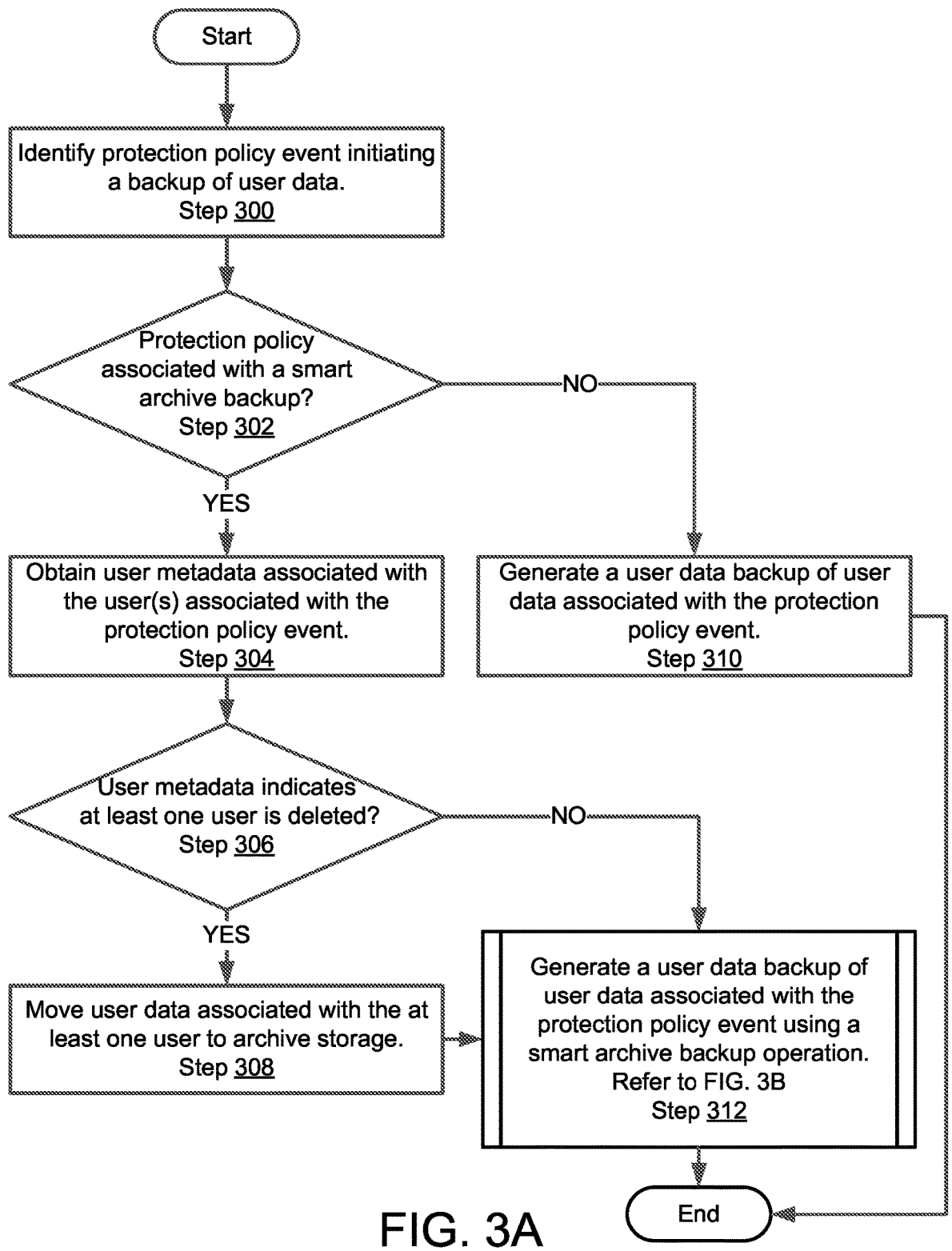
FIG. 3A shows a flowchart of a method of performing a smart archive backup operation in accordance with one or more embodiments of the invention.
Figure 3B:
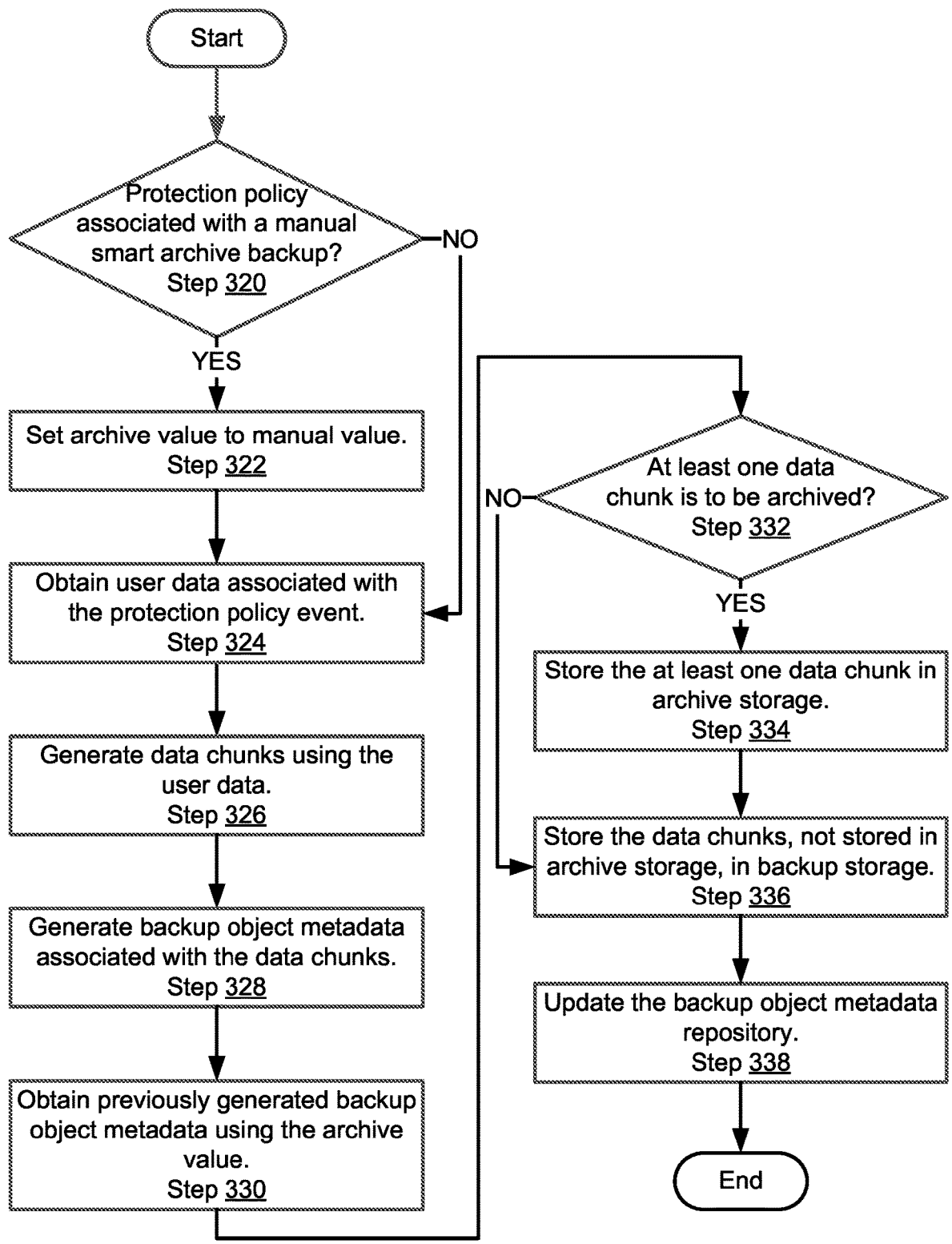
FIG. 3B shows flowchart of a method of generating a user data backup in accordance with one or more embodiments of the invention.

The manager (112) may provide the backup and/or restoration services, as discussed above, and/or includes functionality to perform the methods of FIGS. 3A-3B. The manager (112) may provide other and/or additional services and include other and/or additional functionalities without departing from the invention.

The manager (112) may be implemented using a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the manager (112) described throughout this application and/or all or a portion of the methods illustrated in FIGS. 3A-3B. The manager (112) may be some other physical device without departing from the invention.

The manager (112) may be implemented using computer instructions (e.g., computing code) stored on a persistent storage (e.g., 114) that when executed by a processor of the storage (110) causes the storage (110) to perform the functionality of the manager (112) described throughout this application and/or all or a portion of the methods illustrated in FIGS. 3A-3B.

The manager (112) may utilize and/or generate data structures stored in the persistent storage (114) of the storage (110) and/or other entities (not shown). The persistent storage (114) may be implemented using one or more physical storage devices and/or a logical storage device.

A physical storage device may be hard disk drives, solid state disk drives, tape drives, and/or any other physical storage mediums for the storage of data.

The logical storage device (e.g., virtualized storage) may be a logical entity that utilizes any quantity of storage resources of any number of computing devices for storing data. For example, the logical storage device may utilize portions of storage resources provided by any combination of hard disk drives, solid state disk drives, tape drives, and/or any other physical storage medium of any number of computing devices. The logical storage device may be another type of logical storage without departing from the invention.

In one or more embodiments of the invention, the persistent storage (114) provides data storage services. The data storage services may include storing of data and providing of previously stored data. The persistent storage (114) may provide other and/or additional services without departing from the invention. For additional information regarding the persistent storage (114) of the storage (110), refer to FIG. 1B.

As discussed above, the manager (112) may use and/or generate data structures during the performance of smart archive backup operations. The manager (112) may generate and/or use a user backup metadata repository (120) and a backup object metadata repository (140). The manager (112) may generate and/or use other and/or additional data structures without departing from the invention. Both of the aforementioned data structures (120, 140) are discussed below.

A user backup metadata repository (120) may include one or more data structures that may be used to identify, access, and obtain user data stored in persistent storage (134) of the client service provider (130). The user backup metadata repository (120) may include user identifiers and user protection policies. The user backup metadata repository (120) may include other and/or additional information without departing from the invention. The information in the user backup metadata repository (120) may be obtained by the manager (112) of the storage (110) directly from the clients (100) or from the client service provider (130). The manager (112) may use the user metadata of the user backup metadata repository (120) to access a user's user data on the client service provider (130) and to perform smart archive backup operations as discussed above. The user backup metadata repository (120) may be used by the manager (112) for other and/or additional purposes without departing from the invention. For additional information regarding the user backup metadata repository (120), refer to FIG. 2A.

Figure 1B:
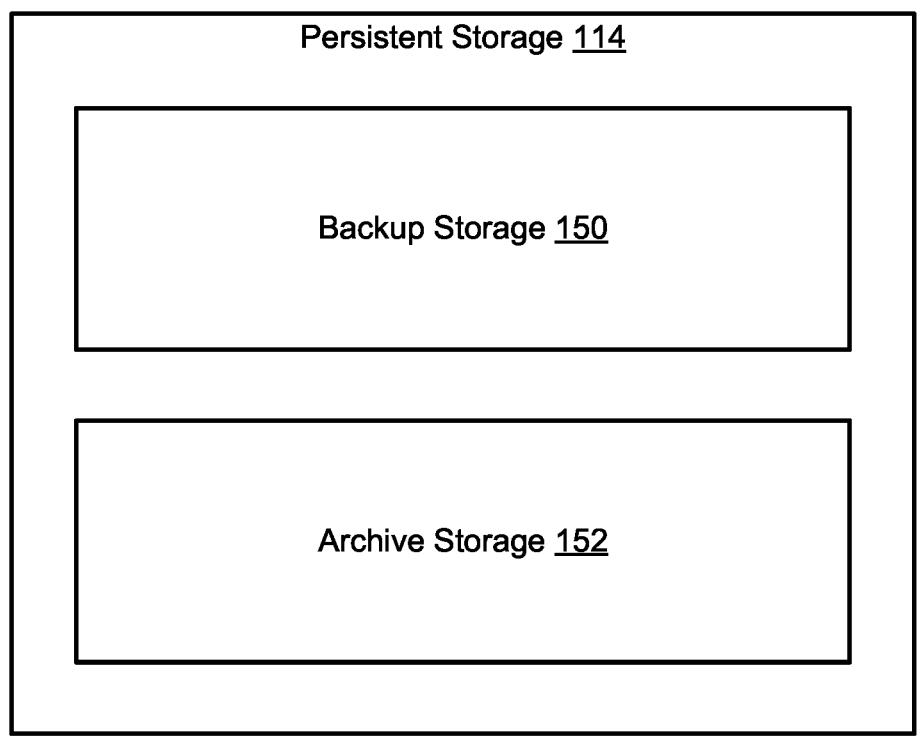
FIG. 1B shows a diagram of persistent storage of a storage in accordance with one or more embodiments of the invention.

A backup object metadata repository (140) may include one or more data structures that may be used to perform smart archive backup operations and to restore user data stored in backup storage (150, FIG. 1B) and archive storage (152, FIG. 1B). The backup object metadata repository (140) may include backup object metadata associated with data chunks generated by the manager (112) during the performance of smart archive backup operations. The backup object metadata repository (140) may include other and/or additional information without departing from the invention. The manager (112) may use the backup object metadata included in the backup object metadata repository to perform smart archive backup operations and to restore user data using user data backups. The backup object metadata repository may be used by the manager (112) for other and/or additional purposes without departing from the invention. For additional information regarding backup object metadata included in the backup object metadata repository (140), refer to FIG. 2C.

The client service provider (130) may be implemented using computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions described in this application and/or all, or a portion, of the methods illustrated in FIGS. 3A-3B. The client service provider (130) may be implemented using other types of computing devices without departing from the invention. For additional details regarding computing devices, refer to FIG. 5.

In one or more embodiments of the invention, the client service provider (130) is implemented using a logical device. The logical device may utilize the computing resources of any number of computing devices and thereby provide the functionality of the client service provider (130) described throughout this application.

In one or more embodiments of the invention, the client service provider (130) hosts an application (132). The application may be a logical entity executed using computing resources (not shown) of the client service provider (130). The application (132) may perform a process. In one or more embodiments of the invention, the application (132) provides a service to users, e.g., the clients (100). The application may be, for example, an instance of a calendar database, an email server, and/or other applications without departing from the invention.

The application (132) may include the functionality to control the access to the user data generated by users of the client service provider (130). The application (132) may, through application programming interface (API) calls, provide portions of the user data to the storage (110) and/or other entities with authorization to access the user data stored on the client service provider (130). The application may include other and/or additional functionality without departing from the invention.

In one or more embodiments of the invention, the application (132) is implemented using computer instructions, e.g., computer code, stored on a persistent storage (e.g., 134) that when executed by a processor(s) of a computing device (see, e.g., FIG. 5) cause the computing device to provide the functionality of the application (132) described throughout this application.

While using the application (132), users may generate and/or obtain user data that may be stored in persistent storage (134). The persistent storage (134) may be implemented using one or more physical storage devices and/or logical storage devices.

A physical storage device may be hard disk drives, solid state disk drives, tape drives, and/or any other physical storage mediums for the storage of data.

The logical storage device (e.g., virtualized storage) may be a logical entity that utilizes any quantity of storage resources of any number of computing devices for storing data. For example, the logical storage device may utilize portions of storage resources provided by any combination of hard disk drives, solid state disk drives, tape drives, and/or any other physical storage medium of any number of computing devices. The logical storage device may be another type of logical storage without departing from the invention.

In one or more embodiments of the invention, the persistent storage (134) provides data storage services. The data storage services may include storing of data and providing of previously stored data. The persistent storage (134) may provide other and/or additional services without departing from the invention. For additional information regarding the persistent storage (134) of the client service provider (130), refer to FIG. 1C.

While the system of FIG. 1A has been described and illustrated as including a limited number of components for the sake of brevity, a system in accordance with embodiments of the invention may include additional, fewer, and/or different components than those illustrated in FIG. 1A without departing from the invention.

As discussed above, the storage (110) in accordance with embodiments of the invention may include persistent storage (114). FIG. 1B shows a diagram of persistent storage of a storage in accordance with one or more embodiments of the invention. As discussed above, the persistent storage (114) may store data structures generated, obtained, and/or used by the manager (112, FIG. 1A). The persistent storage (114) may include two types of storage, backup storage (150) and archive storage (152). The persistent storage may include other and/or additional types of storages without departing from the invention. Both types of storages are discussed below.

The backup storage (150) may be one or more physical and/or logical storage devices of the storage (110, FIG. 1A) and/or another entity(ies) not shown in the system illustrated in FIG. 1A operatively connected to the storage (e.g., remote storage connected via a wireless network) that store data chunks and/or backup metadata of user data backups. The backup storage (150) may store data chunks and/or backup metadata of user data backups for restoration purposes. The backup storage (150) may store other and/or additional data for other and/or additional purposes without departing from the invention.

The physical storage devices and/or the logical storage devices of the backup storage (150) may include storage devices with the capability to perform read and write operations in a manner that is faster and more efficient than those of the archive storage (152), resulting in the backup storage (150) storing data chunks of user data backups for restoration purposes. Data chunks of user data backups may be stored in the backup storage (150) during the retention period as specified by a protection policy associated with the user data backups. Storing data in the backup storage (150) may be computationally and/or monetarily expensive compared to storing data in the archive storage (152) due to the performance capabilities of the storage devices of the backup storage (150) and the large quantities of user data that may be stored in the backup storage (150). Accordingly, data chunks of user data backups may be moved from the backup storage (150) to the archive storage (152) if (i) the data chunks have not changed after a period of time specified by the archive value and the retention period associated with the data chunks during the performance of smart archive backup operations, (ii) if the user associated with the data chunks has been deleted or otherwise removed from the organization that uses the client service provider (130, FIG. 1A), and/or (iii) if the retention period associated with the data chunks has ended.

The archive storage (152) may be one or more physical and/or logical storage devices of the storage (110, FIG. 1A) and/or another entity(ies) not shown in the system illustrated in FIG. 1A operatively connected to the storage (e.g., remote storage connected via a wireless network) that store data chunks and/or backup metadata of user data backups. The archive storage (152) may store data chunks and/or backup metadata of user data backups for long term archival purposes. The archive storage (152) may store other and/or additional data for other and/or additional purposes without departing from the invention.

The physical storage devices and/or the logical storage devices of the archive storage (152) may include storage devices with the capability to perform read and write operations in a manner that is slower and less efficient than those of the backup storage (150), resulting in the archive storage (152) storing data chunks of user data backups for long term archival purposes. Data chunks of user data backups may be stored in the archive storage (152) after the retention period as specified by a protection policy associated with the user data backups expires. Storing data in the archive storage (152) may be computationally and/or monetarily cheaper compared to storing data in the backup storage (150) due to the performance capabilities of the storage devices of the archive storage (152) and the large quantities of user data that may be stored in the archive storage (152). Accordingly, data chunks of user data backups may be moved from the backup storage (150) to the archive storage (152) as discussed above.

Figure 1C:
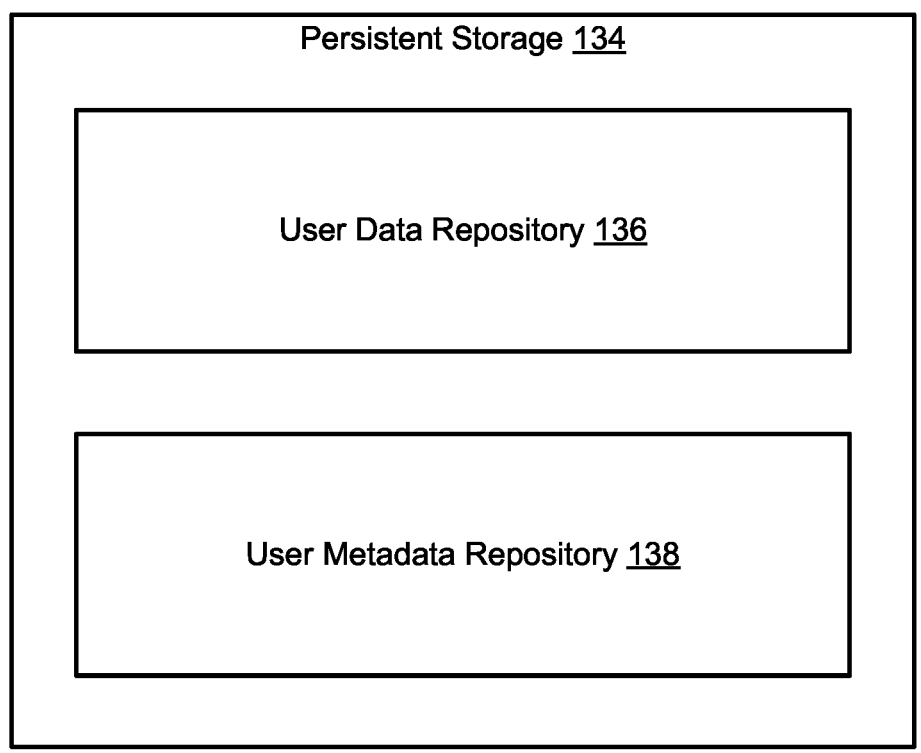
FIG. 1C shows a diagram of persistent storage of a client service provider in accordance with one or more embodiments of the invention.

As discussed above, the client service provider (130, FIG. 1A) in accordance with embodiments of the invention may include persistent storage (134). FIG. 1C shows a diagram of the persistent storage (134) of the client service provider (130) of FIG. 1A in accordance with one or more embodiments of the invention. As discussed above, the persistent storage (134) may store data structures generated by users (e.g., clients (100, FIG. 1A)) of the client service provider (130, FIG. 1A) that may be obtained and/or used by the storage (110, FIG. 1A). The persistent storage (134) of the client service provider (130, FIG. 1A) may include a user data repository (136) and a user metadata repository (138). Each of the data structures stored in the persistent storage (134) of the client service provider (130, FIG. 1A) is discussed below.

The user data repository (136) may include one or more data structures that may be used to generate user data backups. The user data repository (136) may include user data generated by users of the client service provider (130, FIG. 1A) as discussed above. The user data may be any type of data such as database data and email data generated by users of the client service provider (130, FIG. 1A) without departing from the invention. Users (e.g., clients (100)) may use the user data of the user data repository (136) when obtaining computer implemented services from the client service provider (130, FIG. 1A). Additionally, the user data of the user data repository (136) may be obtained by the storage (110, FIG. 1A) for backup generation services. The user data of the user data repository (136) may be used by other and/or additional entities for other and/or additional purposes without departing from the invention.

The user data of the user data repository (136) may be stored in proprietary format that prevents other applications, users and/or other entities from reading and/or using the user data. The user data may not be accessed or used by other users, applications, or other entities without authorization. The user data may be encrypted using encryption keys associated with the application (132, FIG. 1B) and a specific user to secure the user data. The user data of the user data repository (136) may be secured using other security methods without departing from the invention.

In one or more embodiments of the invention, access to the user data repository (136) is gated by one or more applications. In other words, the data included in the user data repository (136) may not be accessed by other entities without utilizing the functionality of the applications that maintain the user data repository (136). For example, the user data repository (136) may include one or more proprietary calendars that are unreadable by entities other than an application (i.e., a calendar application) that maintains the calendars.

In one or more embodiments of the invention, the user data repository (136) includes a database that stores calendars (or other types of message based) communications. The calendars may include calendar events and may be associated with each other by, for example, calendar groups. The aforementioned information may be stored as, for example, user metadata maintained by the database.

In one or more embodiments of the invention, the user data repository (136) only stores and/or allows access to predetermined types and quantities (e.g., not all of the metadata maintained by the database) of metadata regarding the user data. Consequently, requesting all, or a portion, of the metadata associated with user data may not provide sufficient information to determine one or more characteristics of the user data. Embodiments of the invention may address this, and other user data availability problems, by synthesizing, reconstructing, or otherwise obtaining information regarding the user data indirectly. For example, a system in accordance with embodiments of the invention may reconstruct information regarding relationships between calendar events that are present but inaccessible by querying or otherwise requesting metadata from an application that gates access (e.g., controls access) to a calendar database.

In one or more embodiments of the invention, the user data repository (136) is gated by an application that includes limited options for populating the user data repository. For example, the application that gates access to the user data repository may only allow information to be added to the user data in predetermined manners.

In one or more embodiments of the invention, the application (132, FIG. 1A) that gates access to the user data repository (136) does not include functionality to perform granular restorations or restorations of user data of the user data repository (136) associated with user data using backups of the user data repository. For example, the application (e.g., the API associated with the application) may only include functionality to (i) add data to the user data repository (136), (ii) remove data from the user data repository (136), (iii) obtain metadata regarding portions of the user data repository (136) (e.g., events, fields or other types of discrete data constructs), and/or (iv) modify existing metadata.

In one or more embodiments of the invention, when data is added to the user data repository (136) using the API, the application treats the data as newly added even if the data is a backup of data that was previously added to the user data repository (136). For example, if a field of a database of the user data repository (136) is extracted using the API, adding the extracted data using the API may cause the application to treat the data as new rather than as a copy of a previous version of the data.

The user metadata repository (138) may include one or more data structures that may be used to generate user data backups. The user metadata repository (138) may include metadata associated with the user data of the user data repository (136). The user metadata repository (138) may include, for example, user data identifiers, creation timestamps, user identifiers, calendar event information, calendar event occurrence information, calendar group information, database information, email communication information, and other and/or additional information regarding the user data of the user data repository (136) without departing from the invention. The metadata of the user metadata repository (138) may also include a list of users that have been removed from the client service provider (130, FIG. 1A), which may be used by the manager (112, FIG. 1A) during the performance of smart archive backup operations. The metadata of the user metadata repository (138) may be generated by users (e.g., clients (100)) while using the computer implemented services provided by the client service provider (130, FIG. 1A) or by the application (132, FIG. 1A) of the client service provider (130, FIG. 1A). The users (e.g., clients (100)) may use the metadata of the user metadata repository (138) when obtaining the computer implemented services provided by the client service provider (130, FIG. 1A). Additionally, the storage (110, FIG. 1A) may use the metadata of the user metadata repository (138) to generate user data backups.

While the data structures (e.g., 136, 138) of the persistent storage (134) of the client service provider (130, FIG. 1A) are illustrated as separate data structures and have been discussed as including a limited amount of specific information, any of the aforementioned data structures may be divided into any number of data structures, combined with any number of other data structures, and may include additional, less, and/or different information without departing from the invention.

Additionally, while illustrated as being stored in the persistent storage (134), any of the aforementioned data structures may be stored in different locations (e.g., in persistent storage of other computing devices, in memory rather than persistent storage, in a combination of memory and persistent storage, etc.) and/or spanned across any number of computing devices without departing from the invention. Any of the aforementioned data structures may be implemented using, for example, lists, tables, linked lists, databases, and/or other types of data structures.

Figure 2A:
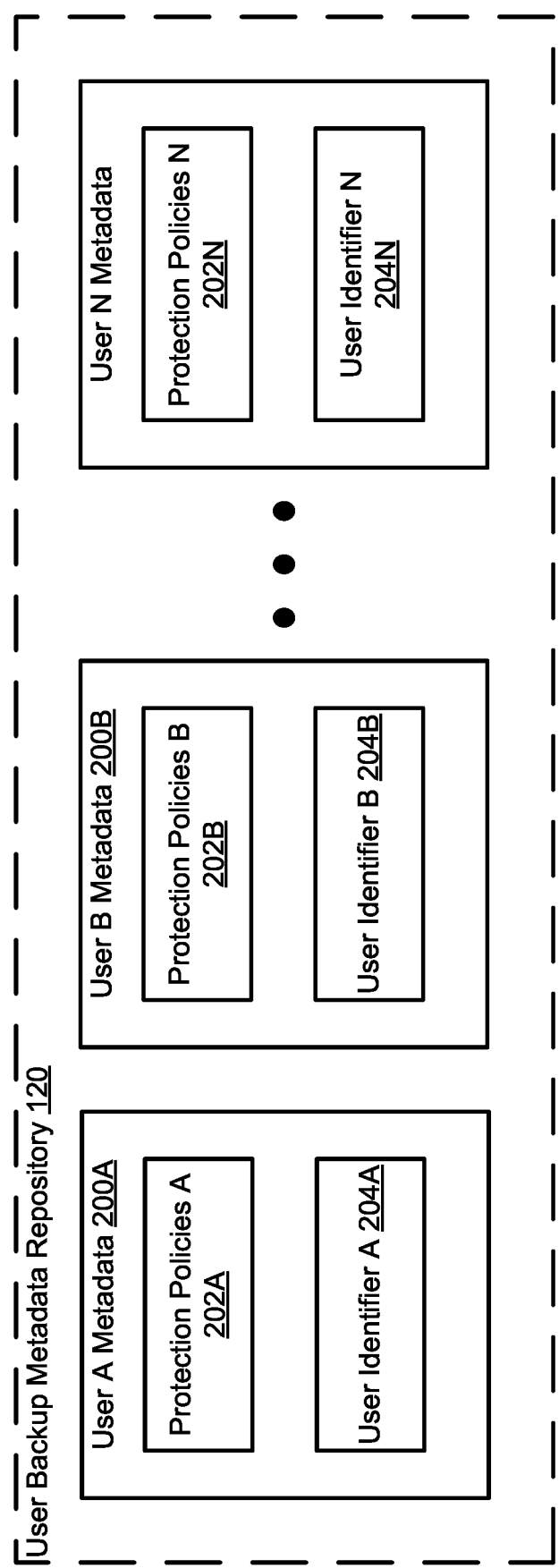
FIG. 2A shows a diagram of a user backup metadata repository in accordance with one or more embodiments of the invention.

As discussed above, the persistent storage of the storage may include a user backup metadata repository. FIG. 2A shows a diagram of a user backup metadata repository in accordance with one or more embodiments of the invention. As discussed above, the user metadata repository may include information used to access user data stored in the client service provider (130, FIG. 1A). The user backup metadata repository (120) may include user A metadata (200A), user B metadata (200B), and user N metadata (200N). Each component of the user backup metadata repository (120) is discussed below.

The user A metadata (200A) may include one or more data structures that may be used to access user data and metadata associated with user A (not shown in FIG. 1A). The user A metadata (200A) may include protection policies A (202A) and user identifier A (204A). User A metadata (200A) may include other and/or additional information regarding user A without departing from the invention. User A metadata (200A) may be obtained from clients (100, FIG. 1A). The manager (112, FIG. 1A) may send a request to the clients for user A metadata (200A) and, in response to the request, and user A metadata (200A) may be obtained from the clients (100, FIG. 1A). The manager (112, FIG. 1A) of the storage (110, FIG. 1A) may use user A metadata to obtain user A data and associated metadata from the user data repository (136, FIG. 1C) and the user metadata repository (138, FIG. 1C). User A metadata (200A) may be used by other and/or additional entities for other and/or additional purposes without departing from the invention.

The user B metadata (200B) may include one or more data structures that may be used to access user data and metadata associated with user B (not shown in FIG. 1A). The user B metadata (200B) may include protection policies B (202B) and user identifier B (204B). User B metadata (200B) may include other and/or additional information regarding user B without departing from the invention. User B metadata (200B) may be obtained from clients (100, FIG. 1A). The manager (112, FIG. 1A) may send a request to the clients for user B metadata (200B) and, in response to the request, and user B metadata (200B) may be obtained from the clients (100, FIG. 1A). The manager (112, FIG. 1A) of the storage (110, FIG. 1A) may use user B metadata to obtain user B data and associated metadata from the user data repository (136, FIG. 1C) and the user metadata repository (138, FIG. 1C). User B metadata (200B) may be used by other and/or additional entities for other and/or additional purposes without departing from the invention.

The user N metadata (200N) may include one or more data structures that may be used to access user data and metadata associated with user N (not shown in FIG. 1A). The user N metadata (200N) may include protection policies N (202N) and user identifier N (204N). User N metadata (200N) may include other and/or additional information regarding user N without departing from the invention. User N metadata (200N) may be obtained from clients (100, FIG. 1A). The manager (112, FIG. 1A) may send a request to the clients for user N metadata (200N) and, in response to the request, and user N metadata (200N) may be obtained from the clients (100, FIG. 1A). The manager (112, FIG. 1A) of the storage (110, FIG. 1A) may use user N metadata to obtain user N data and associated metadata from the user data repository (136, FIG. 1C) and the user metadata repository (138, FIG. 1C). User N metadata (200N) may be used by other and/or additional entities for other and/or additional purposes without departing from the invention.

The protection policies (e.g., 202A, 202B, 202N) may include one or more data structures that may be used to establish user data protection guidelines and requirements. The protection policies (e.g., 202A, 202B, 202N) may include information that denotes a user data backup schedule, user data backup types, and retention periods. The user data backup schedule may specify when a user data backup is to be generated. The user data backup types may specify what type of user data backup is to be generated (e.g., a full user data backup), and what type of backup operation is to be performed (e.g., default smart archive backup or a manual smart archive backup). The retention period may specify an amount of time a user data backup may not be modified and/or deleted from the storage (110, FIG. 1A). The protection policies (e.g., 202A, 202B, 202N) may also include manual and/or default archive values to be used during the performance of smart archive backup operations. The archive values may be represented as a percentage, which when applied to the retention period, specifies a portion of time after which unchanged data blocks of user data backups may be stored in archive storage (152, FIG. 1B) even though the retention period associated with the data blocks may not be expired. The default archive value may be a single percentage in which the manager (112, FIG. 1A) may use during the performance of all default smart archive backup operations unless a protection policy includes a manual archive value in which a user has manually selected a period of time after which unchanged data chunks associated with the user may be moved to archive storage (152, FIG. 1B). The manual archive value and default archive value may be any nonzero percentage without departing from the invention. The protection policies (e.g., 202A, 202B, 202N) may include other and/or additional information that provides guidelines for protecting user data without departing from the invention. The protection policies (e.g., 202A, 202B, 202N) may be obtained from the users of the clients (100, FIG. 1A). The manager (112, FIG. 1A) may use protection policies (e.g., 202A, 202B, 202N) to determine when and how to generate user data backups. The protection policies (e.g., 202A, 202B, 202N) may be used by other and/or additional entities for other and/or additional purposes without departing from the invention.

The user identifiers (e.g., 204A, 204B, 204N) may include one or more data structures that may be used to identify a specific user of the clients (100, FIG. 1A). The user identifiers (e.g., 204A, 204B, 204N) may include a global, unique character string or a bit string that is associated with a specific user. The user identifiers (e.g., 204A, 204B, 204N) may include other and/or additional information that may be used to identify a specific user of the clients (100, FIG. 1A) without departing from the invention. The user identifiers (e.g., 204A, 204B, 204N) may be obtained upon request from the clients (100, FIG. 1A). The manager (112, FIG. 1A) may use the user identifiers (e.g., 204A, 204B, 204N) to identify user data associated with a specific user of the clients (100, FIG. 1A). The user identifiers (e.g., 204A, 204B, 204N) may be used by other and/or additional entities for other and/or additional purposes without departing from the invention.

While the data structures (e.g., 200A, 200B, 200N) of the user backup metadata repository (120) of the persistent storage (114, FIG. 1A) are illustrated as separate data structures and have been discussed as including a limited amount of specific information, any of the aforementioned data structures may be divided into any number of data structures, combined with any number of other data structures, and may include additional, less, and/or different information without departing from the invention. Any of the aforementioned data structures may be implemented using, for example, lists, tables, linked lists, databases, and/or other types of data structures.

As discussed above, FIG. 2B shows a diagram of a backup storage in accordance with one or more embodiments of the invention. As discussed above, the backup storage may include information used to restore user data in the client service provider (130, FIG. 1A). The backup storage (150) may include user A data (126A) and user N data (126N). Each component of the backup storage (150) is discussed below.

The user A data (126A) may include one or more data structures that may be used to restore user data associated with user A (not shown in FIG. 1A). The user A data (126A) may include one or more backups (i.e., user data backup A (212A), user data backup B (212B), user data backup N (212N)). Each backup may include backup data (e.g., backup data A (214A), backup data B (214B), and backup data N (214N)) and backup metadata (e.g., backup metadata A (210A), backup metadata B (210B), backup metadata N (210N)). User A data (126A) may include other and/or additional information regarding user A data without departing from the invention. User A data (126A) may be generated using user data and user metadata from the client service provider (130, FIG. 1A). User A data (126A) may be used by the storage (110, FIG. 1A) to restore inaccessible user A data in the client service provider (130, FIG. 1A) as discussed above. User A data (126A) may be used by other and/or additional entities for other and/or additional purposes without departing from the invention.

The user N data (126N) may include one or more data structures that may be used to restore user data associated with user N (not shown in FIG. 1A). The user N data (126N) may include one or more backups (i.e., user data backup C (212C), user data backup D (212D), user data backup M (212M)). Each backup may include backup data (e.g., backup data C (214C), backup data D (214D), and backup data M (214M)) and backup metadata (e.g., backup metadata C (210C), backup metadata D (210D), backup metadata M (210M)). User N data (126N) may include other and/or additional information regarding user N data without departing from the invention. User N data (126N) may be generated using user data and user metadata obtained from the client service provider (130, FIG. 1A). User N data (126N) may be used by the storage (110, FIG. 1A) to restore inaccessible user N data in the client service provider (130, FIG. 1A) as discussed above. User N data (126N) may be used by other and/or additional entities for other and/or additional purposes without departing from the invention.

In one or more embodiments of the invention, the backup data (e.g., 214A, 214B, 214N, 214C, 214D, 214M) may be divided into any number of data chunks that may include any quantity of data. Each data chunk may be stored in the backup storage (150, FIG. 1B) or the archive storage (152, FIG. 1B). Each data chunk may be originally stored in the backup storage (150, FIG. 1B). Each data chunk may be transferred to the archive storage (152, FIG. 1B) if the data chunks have not changed after a period of time specified by an archive value and a retention period associated with the data chunk during the performance of smart archive backup operations, (ii) if the user associated with the data chunk has been deleted or otherwise removed from the organization that uses the client service provider (130, FIG. 1A), and/or (iii) if the retention period associated with the data chunk has ended.

As discussed above, each user data (e.g., 126A) may include one or more user data backups (e.g., 212A, 212B, 212N) and each user data backup (e.g., 212A) may include both backup data (e.g., 214A) and backup metadata (e.g., 210A). The backup data (e.g., 214A) may include user data obtained from the client service provider (130, FIG. 1A) that has been associated with backup metadata (e.g., 210A), and is therefore, able to be used to restore inaccessible user data associated with the backup (e.g., 214A). The backup metadata (e.g., 210A) may be generated by the manager (112, FIG. 1A) and include user metadata obtained from the client service provider (130, FIG. 1A). The backup metadata (e.g., 210A) may include information regarding the user data included in the backup data (e.g., 214A). For additional information regarding backup metadata (e.g., 210A), refer to FIG. 2C).

While the data structures (e.g., 126A, 126N) of the backup storage (150) of the persistent storage (114, FIG. 1A) are illustrated as separate data structures and have been discussed as including a limited amount of specific information, any of the aforementioned data structures may be divided into any number of data structures, combined with any number of other data structures, and may include additional, less, and/or different information without departing from the invention. Any of the aforementioned data structures may be implemented using, for example, lists, tables, linked lists, databases, and/or other types of data structures.

As discussed above, a user data backup may include backup metadata. FIG. 2C shows a diagram of backup metadata in accordance with one or more embodiments of the invention. The backup metadata may be an embodiment of backup metadata A (210A) discussed above in FIG. 2B. As discussed above, backup metadata A (210A) may include information associated with backup data A (214A, FIG. 2B) and may be used to restore user data in the client service provider (130, FIG. 1A) and to perform smart archive backup operations. Backup metadata A (210A) may include backup object metadata (220) and backup user metadata information (230). Backup metadata A (210A) may include other and/or additional information regarding backup data A (214A, FIG. 2B) without departing from the invention. Each component of the backup metadata A (210A) is discussed below.

Figure 2B:
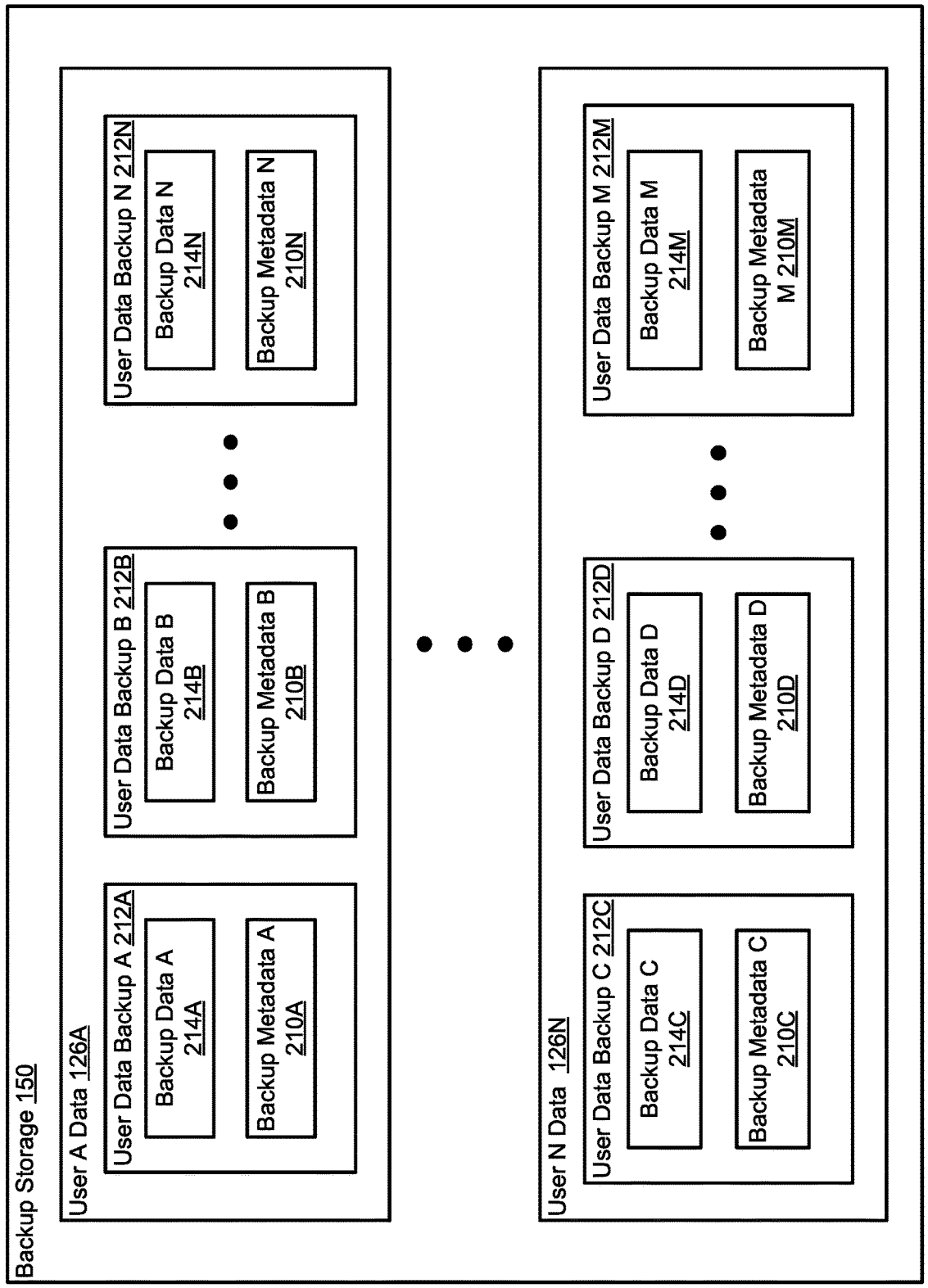
FIG. 2B shows a diagram of a backup storage in accordance with one or more embodiments of the invention.
Figure 2C:
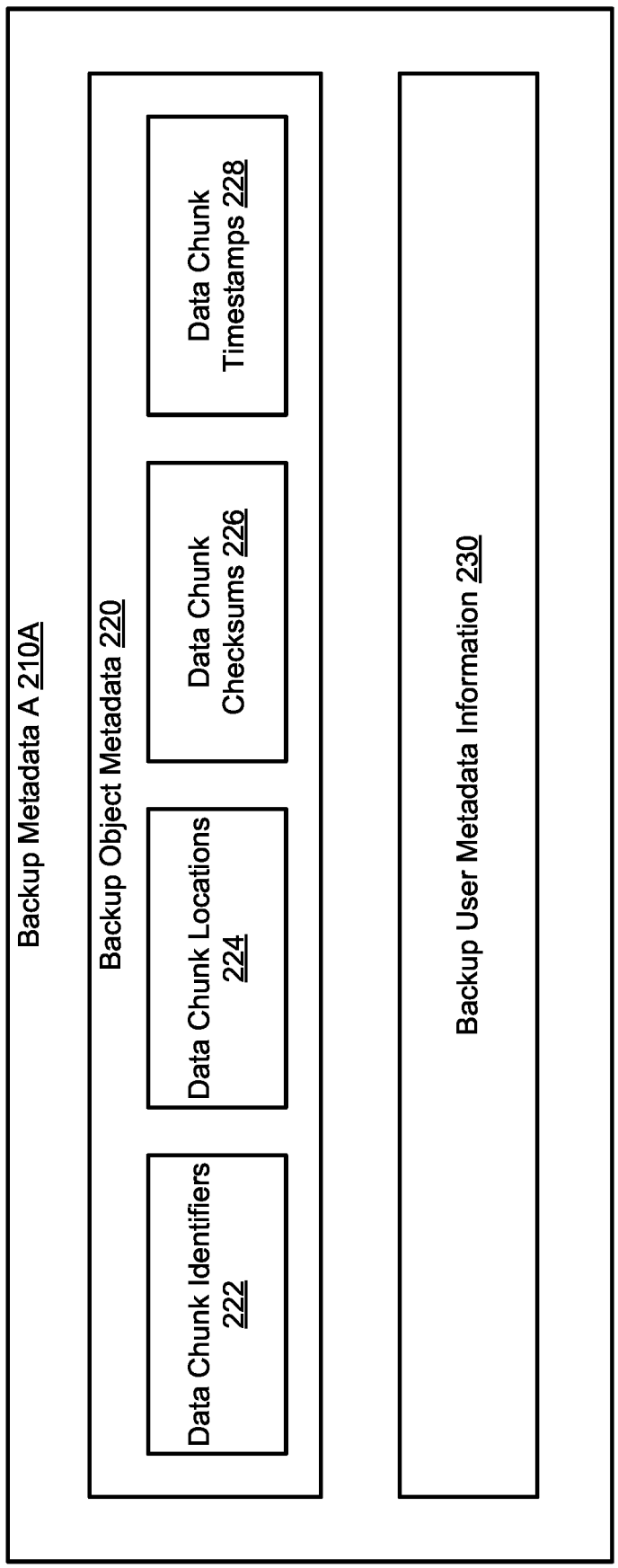
FIG. 2C shows a diagram of a backup metadata in accordance with one or more embodiments of the invention.

The backup object metadata (220) may include one or more data structures that includes information associated with the data chunks of backup data A (214A, FIG. 2B). The backup object metadata may include data chunk identifiers (222), data chunk locations (224), data chunk checksums (226), and data chunk timestamps (228). The backup object metadata (220) may include other and/or additional information regarding associated with the data chunks of backup data A (214A, FIG. 2B) without departing from the invention. The data chunk identifiers (202) may be unique, global bit strings associated with data chunks to specify particular data chunks from other data chunks. The data chunk locations may be references (e.g., pointers) to where associated data chunks are stored (i.e., the backup storage (150, FIG. 1B) or the archive storage (152, FIG. 1C). The data chunk checksums (226) may be small blocks of data generated by applying a checksum generation algorithm to the data chunks. The checksum generation algorithm may be any mathematical algorithm that generates data chunk checksums for data chunks without departing from the invention. The data chunk checksums (226) may be compared with corresponding data chunk checksums of other user data backups to determine whether associated data chunks have changed without comparing the entirety of the data chunks. The data chunk timestamps (228) may be any representation of a point in time such as a date and time that specifies when data chunks were generated. The backup object metadata repository (140, FIG. 1A) may include a copy of the backup object metadata (220).

The backup user metadata information (230) may include one or more data structures that include information regarding the backup data that may be used for restoration purposes. The backup user metadata information may include calendar metadata, conversation metadata associated with email and/or instant messaging conversations, database metadata, and/or other and/or additional types of metadata associated with the user data included in the user data backup without departing from the invention.

For example, the backup user metadata information (230) may include calendar metadata. The calendar metadata may include calendar group information. The calendar group information may include one or more data structures that includes a calendar group topology regarding the one or more calendars included in backup A (214A, FIG. 2B). The calendar group information may specify, for example, a hierarchy of calendars and the associated calendar group identifiers of each calendar included in backup data A (214A, FIG. 2B). The calendar group information may include calendar identifiers (e.g., a unique global bit string associated with a calendar) and calendar group identifiers. The calendar group information may be generated by associating each calendar identifier with its parent calendar group identifier. Each user may include user root calendar group, under which all calendars and calendar subgroups associated with the user reside. The calendar group information may be generated by the manager (112, FIG. 1A) using user metadata from the user metadata repository (138, FIG. 1C) and/or user data from the user data repository (136, FIG. 1C). The calendar group information may be used by the manager to restore inaccessible user A data stored in the client service provider (130, FIG. 1A) associated with backup A (214A, FIG. 2B) in a manner in which the calendars are restored under appropriate calendar groups. The calendar group information may be used by other and/or additional entities for other and/or additional purposes without departing from the invention.

As a further example, the backup user metadata information (230) may include conversation specific metadata. The conversation specific metadata may include information associated with an email conversation, message conversation, and/or another type of conversation involving multiple users and multiple messages without departing from the invention. The conversation metadata may include a conversation identifier, conversation index, and/or other and/or additional information associated with a conversation without departing from the invention. The conversation identifier may include a unique character or bit string that may be used to specify a specific conversation. The conversation identifier may include other and/or additional information that may be used to identify a specific conversation without departing from the invention. The conversation index may include a list of users (or participants) of the conversation and an order of messages that are included in the conversation. The conversation index may include other and/or additional information associated with users and an order of messages of a conversation without departing from the invention.

While the data structures (e.g., 220, 222, 224, 226, 228, 230) of backup metadata A (210A) of the backup storage (150, FIG. 2B) are illustrated as separate data structures and have been discussed as including a limited amount of specific information, any of the aforementioned data structures may be divided into any number of data structures, combined with any number of other data structures, and may include additional, less, and/or different information without departing from the invention. Any of the aforementioned data structures may be implemented using, for example, lists, tables, linked lists, databases, and/or other types of data structures.

FIG. 3A shows a flowchart of a method of performing a smart archive backup operation in accordance with one or more embodiments of the invention. The method may be performed by, for example, a manager (112, FIG. 1A) of the storage (110, FIG. 1A). Other components of the system in FIG. 1A may perform all, or a portion, of the method of FIG. 3A without departing from the invention.

While FIG. 3A is illustrated as a series of steps, any of the steps may be omitted, performed in a different order, additional steps may be included, and/or any or all of the steps may be performed in a parallel and/or partially overlapping manner without departing from the invention.

In step 300, a protection policy event initiating a backup of user data is identified.

As discussed above, protection policies may specify guidelines and/or requirements for protecting user data stored on the client service provider. The protection policies may specify events that trigger backups of user data. The manager of the storage may monitor the protection policies and identify the occurrence of the specified events in the protection policies. In response to the identification of the protection policy events, the manager of the storage may initiate the generation of a backup of user data.

For example, a protection policy may specify that user data of a user should be backed up once a week at noon on Sunday. The manager of the storage may monitor this protection policy as well as the time and date, and at noon every Sunday, may initiate backup generation of user data associated with the protection policy. The protection policy event initiating a backup of user data may be identified via other and/or additional methods without departing from the invention.

In step 302, a determination is made as to whether the protection policy is associated with a smart archive backup operation.

As discussed above, the protection policy may specify a backup type to be generated for user data. The backup type may be a user data backup generated through performing a smart archive backup operation. The manager may check the protection policy to determine whether the protection policy specifies the user data backup is to be generated using a smart archive backup operation. If the protection policy specifies that a user data backup is to be generated using a smart archive backup operation, then the manager may determine that the protection policy is associated with a smart archive backup operation. If the protection policy does not specify that a user data backup is to be generated using a smart archive backup operation, then the manager may determine that the protection policy is not associated with a smart archive backup operation. The determination as to whether the protection policy is associated with a smart archive backup operation may be performed using other and/or additional methods without departing from the invention.

If is determined that the protection policy is associated with a smart archive backup operation, then the method may proceed to step 304. If it is determined that the protection policy is not associated with a smart archive backup, then the method may proceed to step 310.

In step 304, user metadata associated with the user(s) associated with the protection policy event is obtained.

In one or more embodiments of the invention, the manager of the storage sends API calls to the application of the client service provider to obtain the user metadata associated with the user(s) associated with the protection policy event. The manager may send one or more API calls to the application of the client service provider to obtain user metadata associated with the user identifier(s) associated with the protection policy. The API calls may include requests for user metadata that is associated with the user identifier that is stored in the user metadata repository in the client service provider. In response to obtaining the API calls, the application of the client service provider may send the requested user metadata to the storage. The user metadata associated with the user(s) may be obtained via other and/or additional methods without departing from the invention.

In step 306, a determination is made as to whether the user metadata indicates at least one user is deleted.

As discussed above, the user metadata may include a list of user identifiers associated with users that have been deleted from the clients and/or otherwise removed from organizations associated with the clients. Users associated with the user identifiers included in the list of deleted users may be identified by the manager as deleted users. The manager may check the user metadata to identify any user identifiers included in the list of deleted users. If the manager identifies a user identifier included in the list of deleted users, the manager may determine that the user metadata indicates that at least one user is deleted. If the manager does not identify a user identifier included in the list of deleted users or no list is included in the user metadata obtained in step 306, then the manager may determine that the user metadata does not indicate that at least one user is deleted. The determination as to whether the user metadata indicates at least one user is deleted may be made via other and/or additional methods without departing from the invention.

If it determined that at least one user is deleted, then the method may proceed to step 308. If it is determined that at least one user is not deleted, then the method may proceed to step 312.

In step 308, user data associated with the at least one user is moved to archive storage.

In one or more embodiments of the invention, the manager transfers all user data backups associated with the at least one user that are currently stored in backup storage to archive storage. As discussed above, every user data backup may include a user identifier associated with a user. The user data included in the user data backup may be associated with the user. The manager may identify all user data backups that include the user identifiers that are also included in the list of user identifiers identified in step 306 as user data backup associated with deleted users. Therefore, the manager may transfer the identified user data backups to archive storage. After the transfer, the manager may update the backup object metadata repository to specify that the transferred user data backups are now located in the archive storage. The user data associated with the at least one user may be moved to archive storage via other and/or additional methods without departing from the invention.

The method may proceed to step 312.

In step 310, a user data backup of user data associated with the protection policy event is generated.

In one or more embodiments of the invention, the user data backup is generated by generating backup metadata using the user data and the user metadata and associating portions of the user data with portions of the backup metadata. The manager may send one or more API calls to the application of the client service provider. The API calls may include requests for user metadata that is associated with the user data that is stored in the user metadata repository in the client service provider. In response to obtaining the API calls, the application of the client service provider may send the requested user metadata to the storage. As discussed above, the backup metadata may include backup user metadata information. The manager of the storage may generate and/or obtain backup user metadata information using the user data. The backup user metadata information may include information necessary to generate a user data backup such as, for example, calendar event information, database information, electronic mail information, instant messaging information and other and/or additional information associated with the user data. The manager may identify this information in the user data and/or the user metadata and generate backup user metadata information. The backup metadata may also include backup object metadata associated with the user data. The backup metadata may be generated via other and/or additional methods without departing from the invention.

The method may end following step 310.

In step 312, a user data backup of the user data associated with the protection policy event is generated using a smart archive backup operation. In one or more embodiments of the invention, the manager of the generates a user data backup similar to the methods described above in step 310, however, portions of the user data backup may be stored in archive storage and/or backup storage. The manager of the storage may generate data chunks using the user data and store the data chunks that have not changed for a period of time specified by an archive value into archive storage for archival purposes, and store the remaining data chunks into the backup storage for restoration purposes. For additional information regarding generating a user data backup using a smart archive backup operation, refer to FIG. 3B.

The method may end following step 312.

FIG. 3B shows flowchart of a method of generating a user data backup in accordance with one or more embodiments of the invention. The method may be performed by, for example, a manager (112, FIG. 1A) of the storage (110, FIG. 1A). Other components of the system in FIG. 1A may perform all, or a portion, of the method of FIG. 3B without departing from the invention.

While FIG. 3B is illustrated as a series of steps, any of the steps may be omitted, performed in a different order, additional steps may be included, and/or any or all of the steps may be performed in a parallel and/or partially overlapping manner without departing from the invention.

In step 320, a determination is made as to whether the protection policy is associated with a manual smart archive backup operation.

As discussed above, the protection policy may specify a manual archive value to perform a manual smart archive backup operation. The manager may check the protection policy to determine whether the protection policy includes and/or otherwise specifies a manual archive value. If the protection policy specifies manual archive value, then the manager may determine that the protection policy is associated with a manual smart archive backup operation. If the protection policy does not specify that a manual archive value, then the manager may determine that the protection policy is not associated with a manual smart archive backup operation (i.e., a default smart archive backup operation). The determination as to whether the protection policy is associated with a manual smart archive backup operation may be performed using other and/or additional methods without departing from the invention.

If it is determined that the protection policy is associated with a manual smart archive backup operation, then the method may proceed to step 322. If it is determined that the protection policy is not associated with a manual smart archive backup operation, then the method may proceed to step 324.

In step 322, the archive value is set to the manual archive value.

In one or more embodiments of the invention, the manager of the storage sets the archive value to the manual archive value specified in the protection policy. As discussed above, the manual archive value may be specified by a user of the clients during the generation of the protection policy. The manager of the storage may set the archive value associated with the smart archive user data backup to the manual archive value specified by the protection policy. The archive value may be set to the manual archive value via other and/or additional methods without departing from the invention.

In step 324, user data associated with the protection policy event is obtained.

In one or more embodiments of the invention, the manager of the storage sends application interface programming (API) calls to the application of the client service provider to obtain the user data associated with the protection policy event. The user data may refer to information returned by the application that gates access to the user data repository in response to a query (e.g., an API call). The API calls may include requests for user data stored in a user data repository of the client service provider associated with a user based on a user identifier. More specifically, the API calls may include requests for user data associated with a user that include creation timestamps after the timestamp of the most recent previous backup associated with the user data. One or more API calls may be made to the client service provider to obtain the user data without departing from the invention. The user data associated with the protection policy event may be obtained via other and/or additional methods without departing from the invention.

The API calls may include requests for user data based on timestamp analysis. A first API call may request a list of object identifiers associated with user data objects stored in the user data repository that were generated after a specific point in time. In response to the request, the client service provider may send a list of object identifiers associated with objects that were generated after the specified point in time. The storage may send additional API calls requesting the user data that are associated with the obtained object identifiers. In response to obtaining the API calls, the client service provider may send the requested user data to the storage. User data associated with the protection policy event may be obtained from the user data repository via other and/or additional methods without departing from the invention.

For example, a protection policy event may specify that a backup of user data is to be generated once a week at noon on Sunday. The manager may send one or more API calls requesting user data associated with the protection policy event. The API calls may request all user data generated after noon of the previous Sunday. In response to the API calls, the client service provider may identify user data generated after noon of the previous Sunday and send the identified user data to the storage.

In step 326, data chunks are generated using the user data.

In one or more embodiments of the invention, the manager of the storage generates data chunks of the user data obtained from the client service provider. The manager may generate the data chunks using any appropriate method of generating data chunks of user data (e.g., deduplication, erasure coding, etc.) without departing from the invention. For example, the manager may divide the user data to obtain the user data chunks. Each data chunk may include any quantity of data associated with the obtained user data. The data chunks may be generated using the user data via other and/or additional methods without departing from the invention.

In step 328, backup object metadata associated with the data chunks are generated using the data chunks.

In one or more embodiments of the invention, the manager of the storage generates backup object metadata associated with the data chunks using the data chunks by generating data chunk identifiers, data chunk checksums, and data chunk timestamps. The manager of the storage may generate a data structure that may include the data chunk identifiers, the data chunk checksums, and the data chunk timestamps. Each data chunk of the data chunks may be associated with a data chunk identifier, a data checksum, and a data chunk timestamp. The data chunk checksums may be generated by applying a checksum generation algorithm to the data chunks, resulting in generated checksums associated with each data chunk. The backup object metadata associated with the data chunks may be generated using the data chunks via other and/or additional methods without departing from the invention.

In step 330, previously generated backup object metadata is obtained using the archive value.

In one or more embodiments of the invention, the manager of the storage obtains the previously generated backup object metadata using the archive value and a retention period associated the user data. As discussed above, the protection policy may include the retention period associated with the user data. Furthermore, the archive value (i.e., the manual archive value or the default archive value as determined in step 320 and 322) may specify a portion of the retention period after which unchanged data chunks may be stored in archive storage. The manager may use the archive value and the retention period to identify a period of time after which unchanged data chunks may be stored in archive storage. The manager may obtain, from the backup object metadata repository, previous backup object metadata associated with user data backups of the user data that include data chunk timestamps generated during the period in which unchanged data chunks may be stored in archive storage as specified by the archive value and the retention period. Previously generated backup object metadata may be obtained using the archive value via other and/or additional methods without departing from the invention.

In step 332, a determination is made as to whether at least one data chunk is to be archived.

In one or more embodiments of the invention, the manager of the storage determines whether at least one data chunk is to be archived by using the generated backup object metadata and the previously generated backup object metadata. If the generated backup object metadata includes a data chunk timestamp that specifies that a data chunk was generated at a point in time after a point in time in which data chunks may be stored in the archive storage, and, if comparing a corresponding data chunk checksum with the corresponding data checksum(s) included in the previously generated backup object metadata indicates that the data chunk has not changed, then the manager may determine that at least one data chunk is to be archived. If the generated backup object metadata includes no data chunk timestamps that specify that a data chunk was generated at a point in time after a point in time in which data chunks may be stored in the archive storage, or, if comparing data chunk checksums with the corresponding data checksums included in the previously generated backup object metadata indicates that the data chunks have changed, then the manager may determine that no data chunk is to be archived. The determination as to whether at least one data chunk is to be archived may be performed via other and/or additional methods without departing from the invention.

If it is determined that at least one data chunk is to be archived, then the method may proceed to step 334. If it is determined that at least one data chunk is not to be archived, then the method may proceed to step 336.

In step 334, the at least one data chunk is stored in archive storage.

In one or more embodiments of the invention, the manager of the storage stores the at least one data chunk in archive storage. The manager may store the at least one data in archive storage by writing the at least one data chunk generated using the obtained user data to the archive storage, or by moving a data chunk stored in backup storage corresponding to the at least one data chunk to the archive storage. In one or more embodiments of the invention, storing the at least one data chunk in archive storage includes removing corresponding data chunks from the backup storage. Furthermore, the manager may update the backup object metadata to include a data chunk storage location that indicates the data chunk is stored in the archive storage. The at least one data chunk may be stored in the archive storage via other and/or additional methods without departing from the invention.

In step 336, the data chunks, not stored in the archive storage, are stored in the backup storage.

In one or more embodiments of the invention, the manager of the storage stores modified data chunks not stored in the archive storage in the backup storage by writing the modified data chunks to the backup storage. The manager may include references to data chunk locations corresponding to unchanged data chunks stored in the backup storage that are not stored in the archive storage (i.e., have not surpassed the period of time specified by the archive value and the retention period) in the backup object metadata associated with the aforementioned data chunks. The data chunks, not stored in the archive storage, may be stored in the backup storage via other and/or additional methods without departing from the invention.

In step 338, the backup object metadata repository is updated.

In one or more embodiments of the invention, the manager stores a copy of the backup object metadata generated during the performance of the smart archive backup operation in the backup object metadata repository. As a result, the backup object metadata repository includes backup object metadata that may include data chunk identifiers, data chunks locations (i.e., backup storage or archive storage), data chunk checksums, and data chunk timestamps associated with the data chunks stored in the archive storage and the backup storage during the performance of the smart archive backup operation. The backup object metadata included in backup object metadata repository may be used for subsequent smart archive backup operations and/or restoration purposes using backup user metadata information associated with the data chunks of the smart archive backup operation. The backup object metadata repository may be updated via other and/or additional methods without departing from the invention.

The method may end following step 338.

Figure 4A:
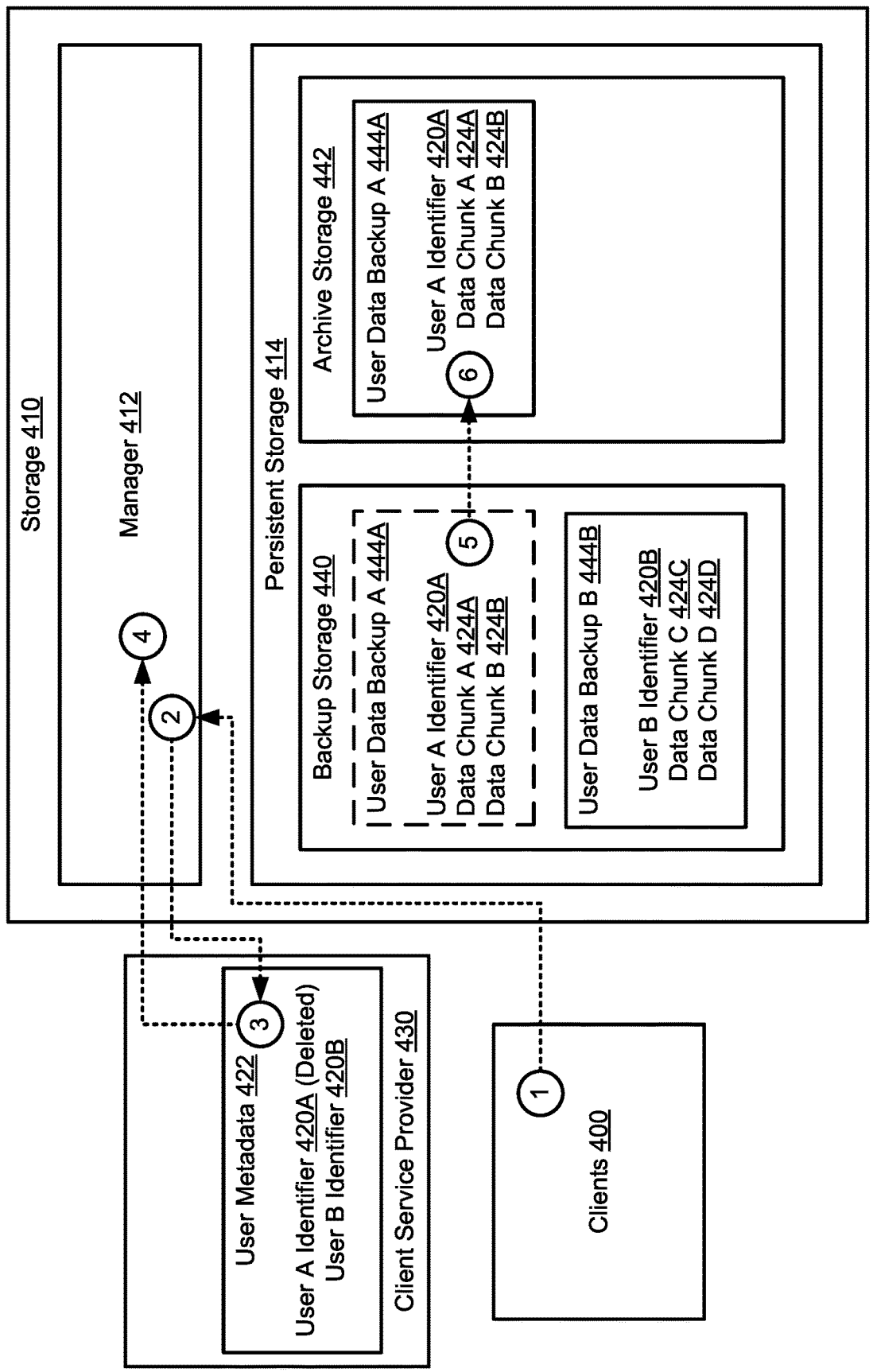
FIGS. 4A-4B show diagrams of the operation of an example system over time in accordance with one or more embodiments of the invention.
Figure 4B:
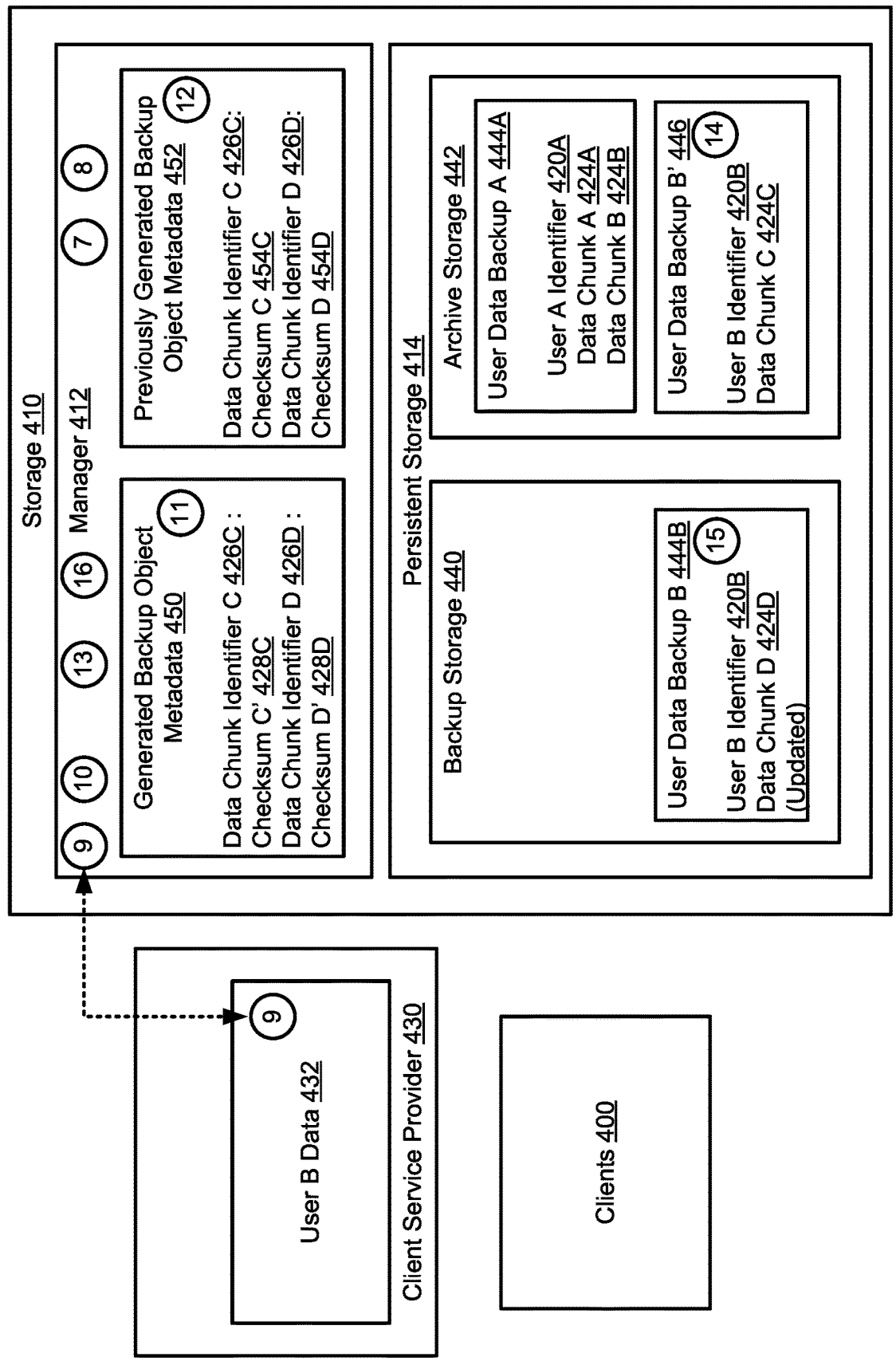

To further clarify embodiments of the invention, a non-limiting example is provided in FIGS. 4A-4B. FIGS. 4A-4B show diagrams of the operation of an example system over time in accordance with one or more embodiments of the invention. FIGS. 4A-4B show a system similar to that illustrated in FIG. 1A. Actions performed by components of the system are illustrated by numbered, circular boxes interconnected, in part, using dashed lines. For the sake of brevity, only a limited number of components of the system of FIG. 1A is illustrated in FIG. 4A.

Example

Turning to FIG. 4A, consider a scenario as illustrated in FIG. 4A in which clients (400) at step 1, send a protection policy to a manager (412) of a storage (410). The storage (410) includes persistent storage (414), which includes backup storage (440) and archive storage (442). The protection policy specifies guidelines for backing up user data stored on the client service provider (430). The user data is associated with two users, user A and user B, each associated with a user identifier (i.e., user A identifier (420A) and user B identifier (420B) respectively). The protection policy specifies a retention period of one year and that the user data associated with the protection policy and that the user data is to be protected using smart archive backup operations. At step 2, the manager (412) identifies a protection policy event associated with the user data stored on the client service provider (430). The protection policy event includes identifying, by the manager (412), the point in time specified by the protection policy specifies that a user data backup is to be generated.

In response to obtaining the protection policy event, at step 3, the manager (412) sends a message to the client service provider (430). The message includes a request for user metadata associated with user A and user B. The client service provider (430) generates the user metadata (422) and sends the user metadata (422) to the manager (412). The user metadata (422) includes the user A identifier (420A) and the user B identifier (420B). The user metadata also specifies that user A has been deleted from the client service provider (430) and that user A is no longer associated with the organization using the clients. At step 4, based on the user metadata (422), the manager (412) determines that the user associated with user identifier A (420A) (i.e., user A) has been deleted from the client service provider (430).

In response to the determination, at step 5, the manager (412) identifies all user data backups associated with user A stored in backup storage (440) using the user A identifier (420A). The backup storage (440) includes user data backup A (444A) and user data backup B (444B). User data backup A (444A) includes the user A identifier (420A), data chunk A (424A), and data chunk B (424B). User data backup B (444B) includes the user A identifier (420A), data chunk C (424C), and data chunk D (424D). The manager (412) identifies that user data backup A (444A) is associated with user A given that user data backup A (444A) includes the user A identifier (420A) and is stored in backup storage (440). At step 6, the manager moves user data backup A (444A) the archive storage (442).

Turning to FIG. 4B, after moving user data associated with deleted users from backup storage (440) to archive storage (442), at step 7, the manager (412) determines that the protection policy is associated with a manual smart archive backup operation. Based on the determination, at step 8, the manager (412) sets the archive value to the manual archive value. The protection policy specifies that the manual archive value is 50% of the retention period. At step 9, the manager (412) sends a message to the client service provider (430). The message includes a request for user data associated with user B. In response to obtaining the message, the client service provider (430) obtains user B data (432) associated with user B and sends the user B data (432) to the manager (412). At step 10, the manager (412) generates data chunks using the user B data (432) to generate two data chunks, data chunk C (424C) and data chunk D (424D).

After generating the data chunks, at step 11, the manager (412) generates generated backup object metadata (450). The generated backup object metadata includes data chunk identifier C (426C) and checksum C' (428C) associated with data chunk C (424C), and data chunk identifier D (426D) and checksum D' (428D) associated with data chunk D (424D). At step 12, the manager obtains previously generated backup object metadata (452) from a backup object metadata repository (not shown) using the manual archive value. The manager (412) identifies all previously generated backup metadata that were generated within the first six months since the first user data backup associated with user B was generated. In this scenario, that includes only a single user data backup, user data backup B (444B). The previously generated backup object metadata (452) includes data chunk identifier C (426C) and checksum C (454C) associated with data chunk C (424C), and data chunk identifier D (426D) and checksum D (454D) associated with data chunk D (424D).

At step 13, the manager (412) determines that data chunk C (424C) has not changed and data chunk D (424D) has changed since the previously generated user data backup was generated. The manager (412) compares the generated backup metadata (450) and the previously generated backup metadata (452), specifically the checksums (428C, 428D, 454C, 454D) to determine whether the data chunks (424C, 424D) have changed. Checksum C' (428C) matches checksum C (454C), therefore the manager (412) determines that data chunk C (424C) has not changed. Checksum D' (428D) does not match checksum D (454D), therefore the manager (412) determines that data chunk has changed. As a result of the determination, the manager (412) that data chunk D (424D) needs to be stored in backup storage (440) and data chunk C (424C) needs to be moved to archive storage (442).

At step 14, based on the determination that data chunk C (424C) has not changed, the manager (412) moves data chunk C (424C) to the archive storage to generate user data backup B' (446). User data backup B' (446) also includes the user B identifier (420B). At step 15, based on the determination that data chunk D (424D) has changed, the manager (412) stores the updated data chunk D (424D) to generate an updated user data backup B (444B). User data backup B (444B) includes user identifier B (420B). At step 16, the manager (412) updates the backup object metadata repository (not shown) to include information that specifies that data chunk D (424D) is stored in backup storage (440) and data chunk C (424C) is stored in archive storage (442).

End of Example

Thus, as illustrated in FIGS. 4A-4B, embodiments of the invention may provide a system that enables improved data protection services to be provided to user data gated by an application of a client service provider. Through the use of smart archive backup operations, user data associated with users that have been removed from organizations associated with the clients may be automatically moved by a manager of the storage to archive storage. Additionally, data chunks associated with user data that have not changed throughout a period specified by either a default or manual archive value and a retention period may also be automatically moved by the manager of the storage to archive storage during generation of a user data backup. As a result, backup storage usage is reduced while maintaining user data backups in archive storage for restoration purposes.

Figure 5:
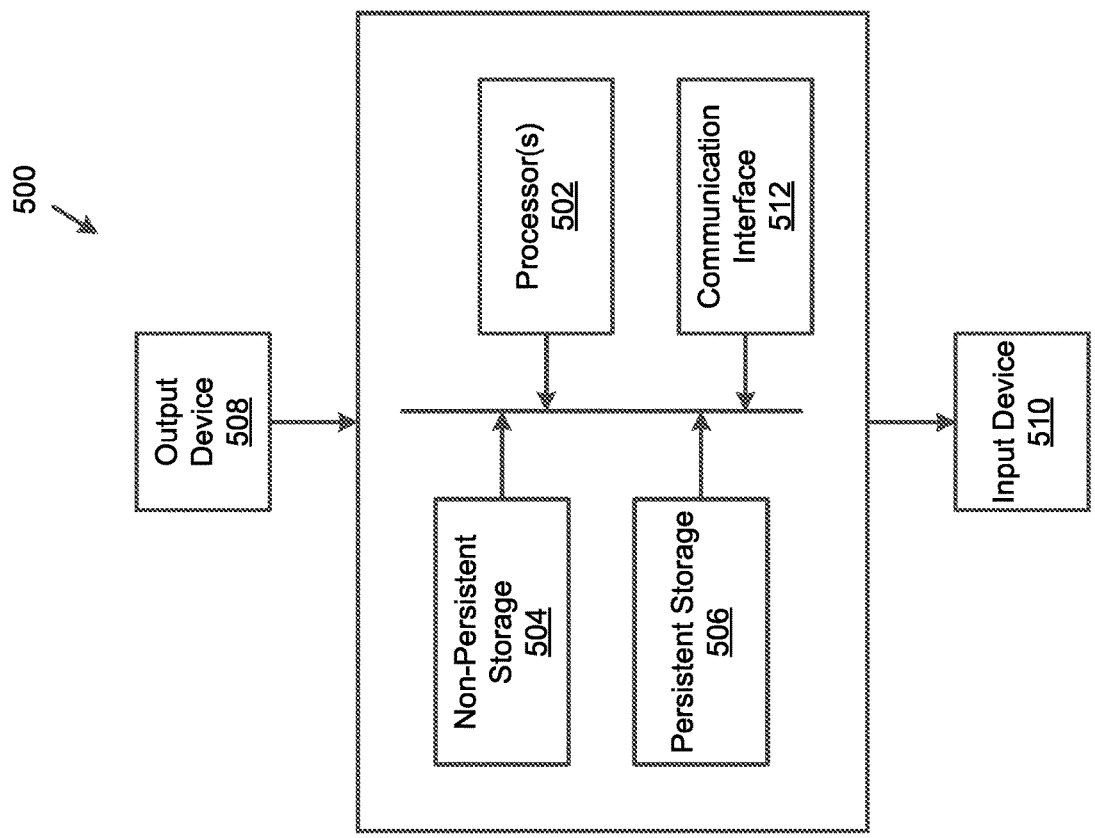
FIG. 5 shows a diagram of a computing device in accordance with one or more embodiments of the invention.

As discussed above, embodiments of the invention may be implemented using computing devices. FIG. 5 shows a diagram of a computing device in accordance with one or more embodiments of the invention. The computing device (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one embodiment of the invention, the computer processor(s) (502) may be an integrated circuit for processing instructions. For example, the computer processor(s) may be one or more cores or micro-cores of a processor. The computing device (500) may also include one or more input devices (510), such as a touchscreen, keyboard, mouse, microphone, touchpad, electronic pen, or any other type of input device. Further, the communication interface (512) may include an integrated circuit for connecting the computing device (500) to a network (not shown) (e.g., a local area network (LAN), a wide area network (WAN) such as the Internet, mobile network, or any other type of network) and/or to another device, such as another computing device.

In one embodiment of the invention, the computing device (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may improve the operation of one or more computing devices. More specifically, embodiments of the invention relate to performing smart archive backup operations on user data. A manager of a storage may proactively transfer user data backups associated with users that have been removed from a client service provider to archive storage during a smart archive backup operation. Further, the manager of the storage may transfer unchanged data blocks from backup storage to archive storage based on a retention period and an archive value associated with the data chunks by performing smart archive backup operations to optimize the storage of data chunks without going against protection policy requirements.

In traditional systems, the users may have to manually transfer data chunks associated with deleted users to archive storage prior to a retention period associated with the data chunks expiring. Additionally, user may have to manually transfer unchanged data chunks from backup storage to archive storage prior to a retention period associated with the data chunks expiring or wait for the retention period associated with the data chunks for a manager to proactively transfer the data chunks to archive storage. Embodiments of the invention proactively transfer data chunks associated with deleted users and unchanged data chunks by performing smart archive backup operations. Waiting on retention periods to end to transfer data from the backup storage to archive storage may result in large quantities of data stored on the backup storage over time. Storing large quantities of data on backup storage may be a computational and financial burden for users.

Thus, embodiments of the invention may address the problem of inefficient use of computing resources to store user data in a backup storage and an archive storage. This problem arises due to the technological nature of the environment in which the data of the data cluster is stored.

The problems discussed above should be understood as being examples of problems solved by embodiments of the invention disclosed herein and the invention should not be limited to solving the same/similar problems. The disclosed invention is broadly applicable to address a range of problems beyond those discussed herein.

While the invention has been described with respect to a limited number of embodiments, those skilled in the art, having benefit of this disclosure, will appreciate that other embodiments can be devised which do not depart from the scope of the technology as disclosed herein. Accordingly, the scope of the invention should be limited only by the attached claims.

What is claimed is:

1. A system for providing data protection services for user data generated by an application, comprising:
   persistent storage comprising an archive storage and a backup storage; and
   a manager programmed to:
   generate data chunks using the user data;
   generate backup object metadata associated with the data chunks;
   obtain previously generated backup object metadata associated with the user data using an archive value;
   make a first determination that at least one data chunk of the data chunks is to be archived using the backup object metadata and the previously generated backup object metadata; and
   in response to the first determination:
   store the at least one data chunk in the archive storage as a portion of a user data backup; and
   store remaining data chunks of the data chunks in the backup storage as a remaining portion of the user data backup, wherein the remaining portion of the user data backup does not comprise the portion of the user data backup, wherein the remaining data chunks do not comprise the at least one data chunk.

2. The system of claim 1, wherein the archive value specifies a portion of a retention period associated with a protection policy after which unchanged data chunks may be stored in archival storage.

3. The system of claim 2, wherein the archive value is one selected from a group consisting of:
   a manual archive value, and
   a default archive value.

4. The system of claim 2, wherein obtaining the previously generated backup object metadata using the archive value comprises:
   determining the portion of the retention period using the archive value and the retention period; and
   obtaining previously generated backup object metadata generated during the portion of the retention period.

5. The system of claim 1, wherein the backup object metadata comprises:
   data chunk identifiers associated with the data chunks,
   checksums associated with the data chunks, and
   timestamps associated with the data chunks.

6. The system of claim 5, wherein making the first determination comprises:
- comparing the checksums of the backup object metadata associated with each data chunk with the checksums of the previously generated backup object metadata associated with each data chunk; and
- identifying at least one data chunk associated with a checksum of the backup object metadata that matches all checksums of the previously generated backup object metadata associated with the at least one data chunk as the at least one data chunk.

7. The system of claim 1, wherein a backup object metadata repository specifies storage locations associated with the data chunks.

8. The system of claim 1, the manager is further programmed to:
- prior to generating data chunks using the user data:
  - make a second determination that a protection policy is associated with a smart archive backup; and
  - in response to the second determination:
    - obtain user metadata associated with users;
    - make a third determination that the user metadata indicates at least one user is deleted; and
    - in response to the third determination:
      - move portions of user data backups associated with the at least one user from the backup storage to the archive storage.

9. A method for providing data protection services for user data generated by an application, the method comprising:
- generating data chunks using the user data;
- generating backup object metadata associated with the data chunks;
- obtaining previously generated backup object metadata associated with the user data using an archive value;
- making a first determination that at least one data chunk of the data chunks is to be archived using the backup object metadata and the previously generated backup object metadata; and
- in response to the first determination:
  - storing the at least one data chunk in an archive storage as a portion of a user data backup; and
  - storing remaining data chunks of the data chunks in a backup storage as a remaining portion of the user data backup, wherein the remaining portion of the user data backup does not comprise the portion of the user data backup, wherein the remaining data chunks do not comprise the at least one data chunk.

10. The method of claim 9, wherein the archive value specifies a portion of a retention period associated with a protection policy after which unchanged data chunks may be stored in archival storage.

11. The method of claim 10, wherein the archive value is one selected from a group consisting of:
- a manual archive value, and
- a default archive value.

12. The method of claim 10, wherein obtaining the previously generated backup object metadata using the archive value comprises:
- determining the portion of the retention period using the archive value and the retention period; and
- obtaining previously generated backup object metadata generated during the portion of the retention period.

13. The method of claim 9, wherein the backup object metadata comprises:
- data chunk identifiers associated with the data chunks,
- checksums associated with the data chunks, and
- timestamps associated with the data chunks.

14. The method of claim 13, wherein making the first determination comprises:
- comparing the checksums of the backup object metadata associated with each data chunk with the checksums of the previously generated backup object metadata associated with each data chunk; and
- identifying at least one data chunk associated with a checksum of the backup object metadata that matches all checksums of the previously generated backup object metadata associated with the at least one data chunk as the at least one data chunk.

15. The method of claim 9, wherein a backup object metadata repository specifies storage locations associated with the data chunks.

16. The method of claim 9, wherein the method further comprises:
- prior to generating data chunks using the user data:
  - making a second determination that a protection policy is associated with a smart archive backup; and
  - in response to the second determination:
    - obtaining user metadata associated with users;
    - making a third determination that the user metadata indicates at least one user is deleted; and
    - in response to the third determination:
      - moving portions of user data backups associated with the at least one user from the backup storage to the archive storage.

17. A non-transitory computer readable medium comprising computer readable program code, which when executed by a computer processor enables the computer processor to perform a method for providing data protection services for user data generated by an application, the method comprising:
- generating data chunks using the user data;
- generating backup object metadata associated with the data chunks;
- obtaining previously generated backup object metadata associated with the user data using an archive value;
- making a first determination that at least one data chunk of the data chunks is to be archived using the backup object metadata and the previously generated backup object metadata; and
- in response to the first determination:
  - storing the at least one data chunk in an archive storage as a portion of a user data backup; and
  - storing remaining data chunks of the data chunks in a backup storage as a remaining portion of the user data backup, wherein the remaining portion of the user data backup does not comprise the portion of the user data backup, wherein the remaining data chunks do not comprise the at least one data chunk.

18. The non-transitory computer readable medium of claim 17, wherein the archive value specifies a portion of a retention period associated with a protection policy after which unchanged data chunks may be stored in archival storage.

19. The non-transitory computer readable medium of claim 18, wherein the archive value is one selected from a group consisting of:
- a manual archive value, and
- a default archive value.

20. The non-transitory computer readable medium of claim 18, wherein obtaining the previously generated backup object metadata using the archive value comprises:
- determining the portion of the retention period using the archive value and the retention period; and obtaining previously generated backup object metadata generated during the portion of the retention period.

* * * * *